United States Patent
Silverman et al.

(10) Patent No.: US 10,218,416 B2
(45) Date of Patent: Feb. 26, 2019

(54) MU-MIMO GROUPING SYSTEM

(71) Applicant: Cisco Technology, Inc., San Jose, CA (US)

(72) Inventors: Matthew A. Silverman, Shaker Heights, OH (US); Paul J. Stager, Akron, OH (US); David S. Kloper, Santa Clara, CA (US); Brian D. Hart, Sunnyvale, CA (US); Qing Zhao, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/431,539

(22) Filed: Feb. 13, 2017

(65) Prior Publication Data
US 2018/0234141 A1    Aug. 16, 2018

(51) Int. Cl.
| | |
|---|---|
| H04B 7/04 | (2017.01) |
| H04B 7/0452 | (2017.01) |
| H04L 12/26 | (2006.01) |
| H04L 12/24 | (2006.01) |

(52) U.S. Cl.
CPC ....... *H04B 7/0452* (2013.01); *H04L 41/0893* (2013.01); *H04L 43/0894* (2013.01)

(58) Field of Classification Search
CPC .. H04B 7/0452; H04B 7/0413; H04L 43/0894
USPC ......................................................... 375/267
See application file for complete search history.

(56) References Cited

U.S. PATENT DOCUMENTS

| | | | | |
|---|---|---|---|---|
| 2007/0064785 A1* | 3/2007 | Alapuranen | .......... | H04L 1/0007 375/224 |
| 2010/0142633 A1* | 6/2010 | Yu | ........................ | H04B 7/0417 375/260 |
| 2010/0215108 A1* | 8/2010 | Balachandran | ...... | H04B 7/0452 375/260 |

(Continued)

OTHER PUBLICATIONS

IEEE Standard for Information Technology—Telecommunications and information exchange between systems Local and metropolitan area networks—Specific requirements, "Part II: Wireless LAN Medium Access Control (MAC) and Physical Layer (PHY) Specifications—Amendment 4: Enhancements for Very High Throughput for Operation in Bands below 6 GHz," Approved Dec. 11, 2013; Specifically citing 802.11ac—Sections 8-10 (pp. 33-194) and section 22 (pp. 214-339).

*Primary Examiner* — Kevin M Burd
(74) *Attorney, Agent, or Firm* — Patterson + Sheridan, LLP

(57) ABSTRACT

Embodiments herein describe a network device (e.g., an access point) that dynamically arranges multi-user (MU) multiple input multiple output (MIMO) compatible client devices into MU-MIMO groups. That is, the network device uses network metrics and historical data to change the assignment of client devices in the MU-MIMO groups which may improve MU-MIMO efficiency by reducing the amount of power that leaks between the clients devices in the group. In one embodiment, the AP identifies a MU-MIMO group based on a performance evaluation such as evaluating network metric or determining if the group is underutilized. The AP can replace the identified MU-MIMO group with a substitute MU-MIMO group where the substitute MU-MIMO group is selected based on historical data corresponding to the client devices assigned to the substitute MU-MIMO group.

16 Claims, 5 Drawing Sheets

(56) References Cited

U.S. PATENT DOCUMENTS

2013/0301551 A1   11/2013  Ghosh et al.
2016/0345343 A1*  11/2016  Elsherif .............. H04W 72/121

* cited by examiner

ACTIVE GROUPS 300

| GROUP A | AVG COHERENCY TIME 305 | CHANNEL CORRELATION 310 | SCORE 315 |
|---|---|---|---|
| GROUP B | AVG COHERENCY TIME 305 | CHANNEL CORRELATION 310 | SCORE 315 |
| ... | | | |
| GROUP C | AVG COHERENCY TIME 305 | CHANNEL CORRELATION 310 | SCORE 315 |

INACTIVE GROUPS 350

| GROUP D | AVG COHERENCY TIME 305 | CHANNEL CORRELATION 310 | SCORE 315 |
|---|---|---|---|
| ... | | | |
| GROUP E | AVG COHERENCY TIME 305 | CHANNEL CORRELATION 310 | SCORE 315 |

| GROUP B | AVG COHERENCY TIME 305 | CHANNEL CORRELATION 310 | DATA RATE 405 | SCORE 315 |
|---|---|---|---|---|
| GROUP A | AVG COHERENCY TIME 305 | CHANNEL CORRELATION 310 | DATA RATE 405 | SCORE 315 |
| GROUP C | AVG COHERENCY TIME 305 | CHANNEL CORRELATION 310 | DATA RATE 405 | SCORE 315 |

450

| GROUP E | AVG COHERENCY TIME 305 | CHANNEL CORRELATION 310 | DATA RATE 405 | SCORE 315 |
|---|---|---|---|---|
| GROUP D | AVG COHERENCY TIME 305 | CHANNEL CORRELATION 310 | DATA RATE 405 | SCORE 315 |

FIG. 4

MU-MIMO GROUPING SYSTEM

TECHNICAL FIELD

Embodiments presented in this disclosure generally relate to dynamically grouping clients in multi-user (MU) multiple input multiple output (MIMO) groups.

BACKGROUND

MIMO technologies are used in access points that have multiple antennas to detect wireless signals and aggregate multiple output connections. MU-MIMO is a wireless MIMO technique where one device sends different data to multiple other devices at the same time. The success of an MU-MIMO transmission depends on the precoding done at the transmitter and filtering at the receiver which is standardized in IEEE 802.11ac.

The devices (also referred to herein as client devices) can be arranged into MU-MIMO groups. Using transmission chains, a transmitting device (e.g., an access point) can transmit MU-MIMO frames to a MU-MIMO group such that a first client device in the group receives only data intended for it while a second client device in the group receives only data intended for it. To do so, an access point (AP) can use a pseudo inverse of a matrix representing the channel between the AP and a particular client device to null out power (or data) transmitted to other client devices in the group. However, some of the power intended for one of the client devices in the group can be received by the other client devices in the group which can reduce the effectiveness of MU-MIMO.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates ranking active and inactive MU-MIMO groups, according to one embodiment described herein.

FIG. 4 illustrates adjusting the ranking of the active and inactive MU-MIMO groups in FIG. 3, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
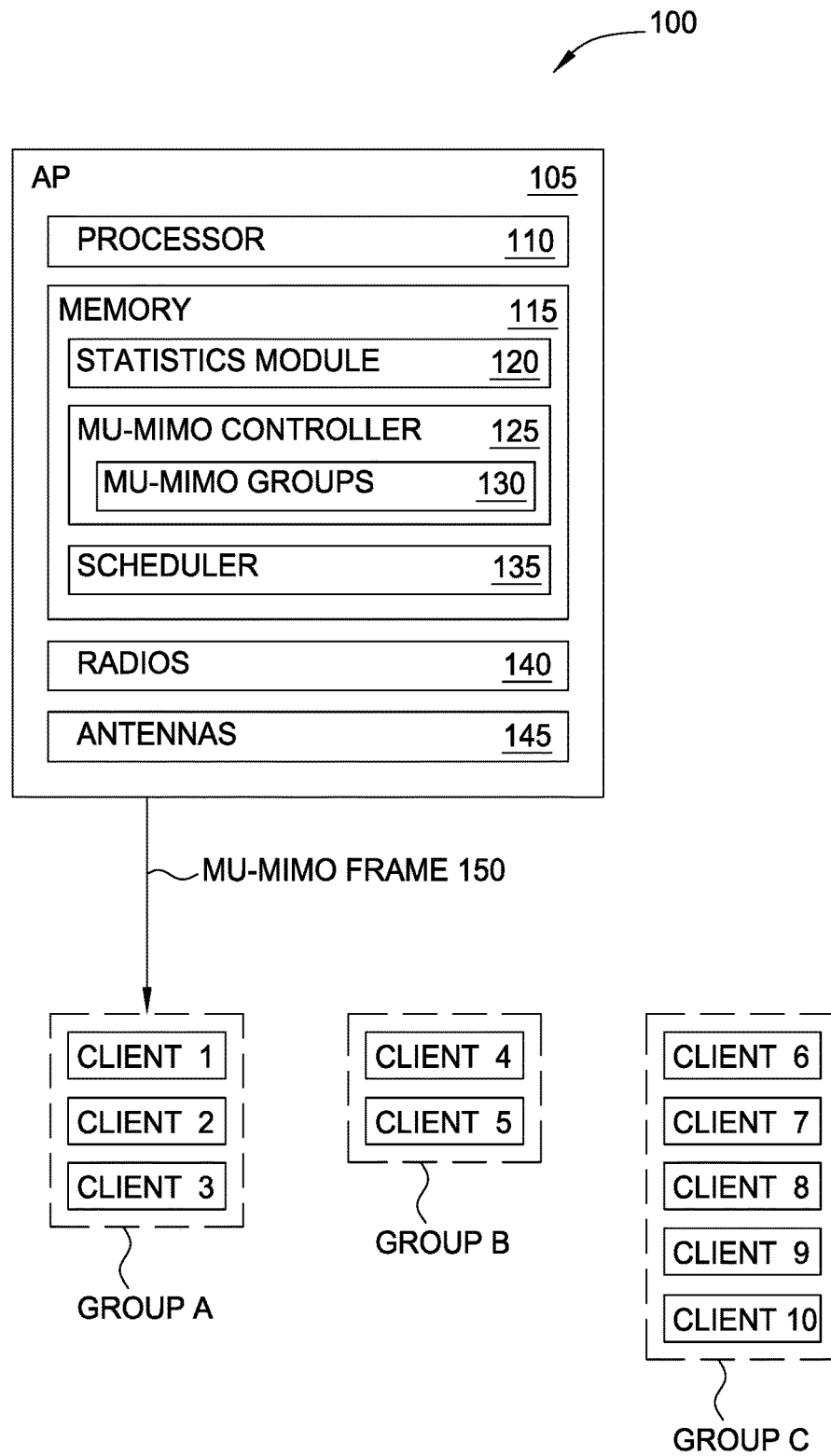
FIG. 1 illustrates a communication system implementing MU-MIMO, according to one embodiment described herein.

One embodiment presented in this disclosure is a network device that includes at least one radio, an antenna coupled to the at least one radio, and control logic configured to form a plurality of MU-MIMO groups, each of the MU-MIMO groups comprising a first plurality of client devices. The control logic is configured to transmit MU-MIMO data to the client devices using the plurality of MU-MIMO groups and the radio, identify one of the MU-MIMO groups based on a performance evaluation, and replace the identified MU-MIMO group with a substitute MU-MIMO group where the substitute MU-MIMO group is selected based on historical data corresponding to a second plurality client devices assigned to the substitute MU-MIMO group.

Another embodiment described herein is a computer-readable storage medium for operating a network device that includes computer-readable program code configured to perform an operation. The operation includes forming a plurality of MU-MIMO groups, each of the MU-MIMO groups comprising a first plurality of client devices, transmitting MU-MIMO data to the client devices using the plurality of MU-MIMO groups, identifying one of the MU-MIMO groups based on a performance evaluation, and replacing the identified MU-MIMO group with a substitute MU-MIMO group where the substitute MU-MIMO group is selected based on historical data corresponding to a second plurality client devices assigned to the substitute MU-MIMO group.

Another embodiment described herein is a method of operating a network device. The method includes forming a plurality of MU-MIMO groups, each of the MU-MIMO groups comprising a first plurality of client devices, transmitting MU-MIMO data to the client devices using the plurality of MU-MIMO groups, identifying one of the MU-MIMO groups based on a performance evaluation, and replacing the identified MU-MIMO group with a substitute MU-MIMO group where the substitute MU-MIMO group is selected based on historical data corresponding to a second plurality client devices assigned to the substitute MU-MIMO group.

Example Embodiments

The embodiments herein describe a network device (e.g., an access point (AP)) that dynamically arranges MU-MIMO compatible client devices into MU-MIMO groups. More specifically, the network device uses network metrics and historical data to change the assignment of client devices in the MU-MIMO groups which may improve MU-MIMO efficiency by creating groups that maximize PHY channel capacity and reduce sounding overhead. In one embodiment, the AP generates a score for each of the MU-MIMO groups which represents the ability of the group to receive MU-MIMO traffic. Based on the score, the AP can decide whether to change or replace the group.

In one embodiment, the AP identifies the coherency time for each of the client devices in the groups which represents the frequency at which the channel between the AP and the client device is resounded. In one embodiment, "sounding" refers to transmitting wireless signals in a communication channel to generate a channel matrix representing the amplitude and phase changes resulting from transmitting wireless signals in the channel. Because the clients in the group are resounded according to the client device with the shortest coherency time, assigning clients with similar coherency times to the same group may reduce the amount of time the AP has to spend on resounding the channels. Moreover, the AP may also identify an inter-client channel correlation between the client devices which indicates the similarity of the channels between the clients and the AP. In MU-MIMO, the power intended for one client is more likely to leak into the channel of an unintended client device in the same group if the channels of the two clients are similar. The AP may assign the client devices into groups depending on the similarity of the coherency times and the dissimilarity of the channels between the clients and the AP. Other metrics, such as inter-client correlation of traffic patterns, may also be included. The AP can continue to update the score of the groups when the coherency times and inter-client channel correlation changes. In one embodiment, the AP maintains scores for both active MU-MIMO groups (i.e., groups that the AP can use to transmit MU-MIMO traffic) and inactive MU-MIMO groups (i.e., groups that are not available for transmitting MU-MIMO traffic). If the score for an active group is less than a score for an inactive group, the AP can deactivate the active group and activate the inactive group so that this group can be used to transmit MU-MIMO traffic.

In one embodiment, the AP assigns the client devices into a predefined number of random MU-MIMO groups. For example, the AP may randomly assign each of the client devices connected to the AP into five of the sixty-two MU-MIMO groups permitted by IEEE 802.11ac. Once assigned, the AP can determine how often the MU-MIMO groups are used or if the client devices should be added to additional groups. For example, before transmitting data, the AP may use a scheduler to identify sets of clients that are to receive the data. If there is a MU-MIMO group that contains the set of clients, the AP can transmit MU-MIMO frames to that group. If there is no MU-MIMO group that contains the set of client devices, the AP transmits the data to the set of clients using single-user transmission and stores an indication that the set of clients does not have a corresponding MU-MIMO group. If a MU-MIMO group is underutilized (e.g., infrequently used to transmit MU-MIMO traffic), the AP can replace the underutilized group with a new group that includes the set of clients that does not already have a corresponding MU-MIMO group.

FIG. 1 illustrates a communication system 100 implementing MU-MIMO, according to one embodiment described herein. The communication system 100 includes an AP 105 and client devices (i.e., Client 1-10) which are assigned to different MU-MIMO groups (i.e., Groups A-C). The AP 105 includes a processor 110, memory 115, radios 140 and antennas 145. The processor 110 may include a network processor implemented using an application specific integrated circuit (ASIC) or a general purpose processor. The memory 115 may include volatile memory, non-volatile memory, and combinations thereof. As shown, the memory 115 includes a statistics module 120, MU-MIMO controller 125, and a schedule 135 (referred to collectively as control logic). Although these components are shown as being implemented in memory 115 as software applications, in other embodiments, the statistics module 120, the MU-MIMO controller 125, and the scheduler 135 may be implemented entirely using hardware elements or using a combination of hardware and firmware/software.

The statistics module 120 generates network metrics corresponding to the Clients 1-10 in communication with the AP 105. For example, the network metrics may include the coherency time for each of the client devices, the inter-client channel correlation between the client devices, a data rate for the client devices, and retry rates for the client devices. In one embodiment, the MU-MIMO controller 125 uses the network metrics gathered by the statistics module 120 to create, alter, replace, or delete MU-MIMO groups 130. For example, the MU-MIMO controller 125 may use the coherency times and inter-client channel correlation values to assign the Clients 1-10 into the Groups A-C as shown. As described in more detail below, the MU-MIMO controller 125 may then rearrange the client devices in the groups or replace the groups with different groups. In one embodiment, the controller 125 maintains active groups (e.g., Groups A-C) which can currently be used to perform MU-MIMO as well as inactive groups (not shown in FIG. 1). The inactive groups can contain different client devices (e.g., different from the Clients 1-10) or may include some or all of the Clients 1-10. By assigning scores to the active and inactive MU-MIMO groups 130, the MU-MIMO controller 125 can determine whether to replace one of the active groups 130 with an inactive group 130.

In another embodiment, instead of using the network metrics to assign the clients to one or more of the MU-MIMO groups 130, the MU-MIMO controller 125 may randomly assign the client devices to a predefined number of the groups 130. The controller 125 can then use the network metrics generated by the statistics module 120 (e.g., coherency times, inter-client channel estimates, data rates, or retry rates) or a utilization of the groups 130 (e.g., how often a group is used to transmit a MU-MIMO frame) to determine whether to modify or replace the groups 130.

The scheduler 135 determines whether to transmit data using MU-MIMO or other transmission techniques (e.g., single user transmission). For example, the scheduler 135 may schedule data to be transmitted to a set or plurality of the client devices. If there is a MU-MIMO group that contains the set of client devices, then the AP 105 can use MU-MIMO frames to transmit the data. If not, the scheduler 135 may use single user transmission to transmit the data. In FIG. 1, the AP 105 transmits the MU-MIMO frame 150 to MU-MIMO Group A. For example, the frame 150 may include data for some, or all, of the Clients 1-3 as determined by the scheduler 135. As mentioned above, using the pseudo inverse matrix representing the communication channels between the Clients 1-3 and the AP 105, ideally, the data is received only at the intended client device. For example, the MU-MIMO frame 150 may include data for both Clients 1 and 2 but Client 1 does not receive the data for Client 2, nor does Client 2 receive the data intended for claim 1. Moreover, Client 3 does not receive the data for either Client 1 or Client 2. However, in real-world application, typically some amount of power leaks and is received at the other client devices in the group.

The MU-MIMO Groups A-C in FIG. 1 each includes different client devices but in other embodiments, the same client device may be assigned to multiple active groups. The MU-MIMO controller 125 may transmit management frames to the individual client devices instructing the devices which MU-MIMO group or groups they are assigned to. When transmitting a MU-MIMO frame, the preamble of the frame indicates the group for which the data is intended. Thus, although all the Clients 1-10 may receive the MU-MIMO frame 150, once the clients in Groups B and C determine the frame 150 is for Group A using the preamble, these clients can ignore the remainder of frame 150. However, the Clients 1-3 in Group A continue to process the remaining portion of the frame 150 to determine whether the frame 150 contains data intended for them.

Figure 2:
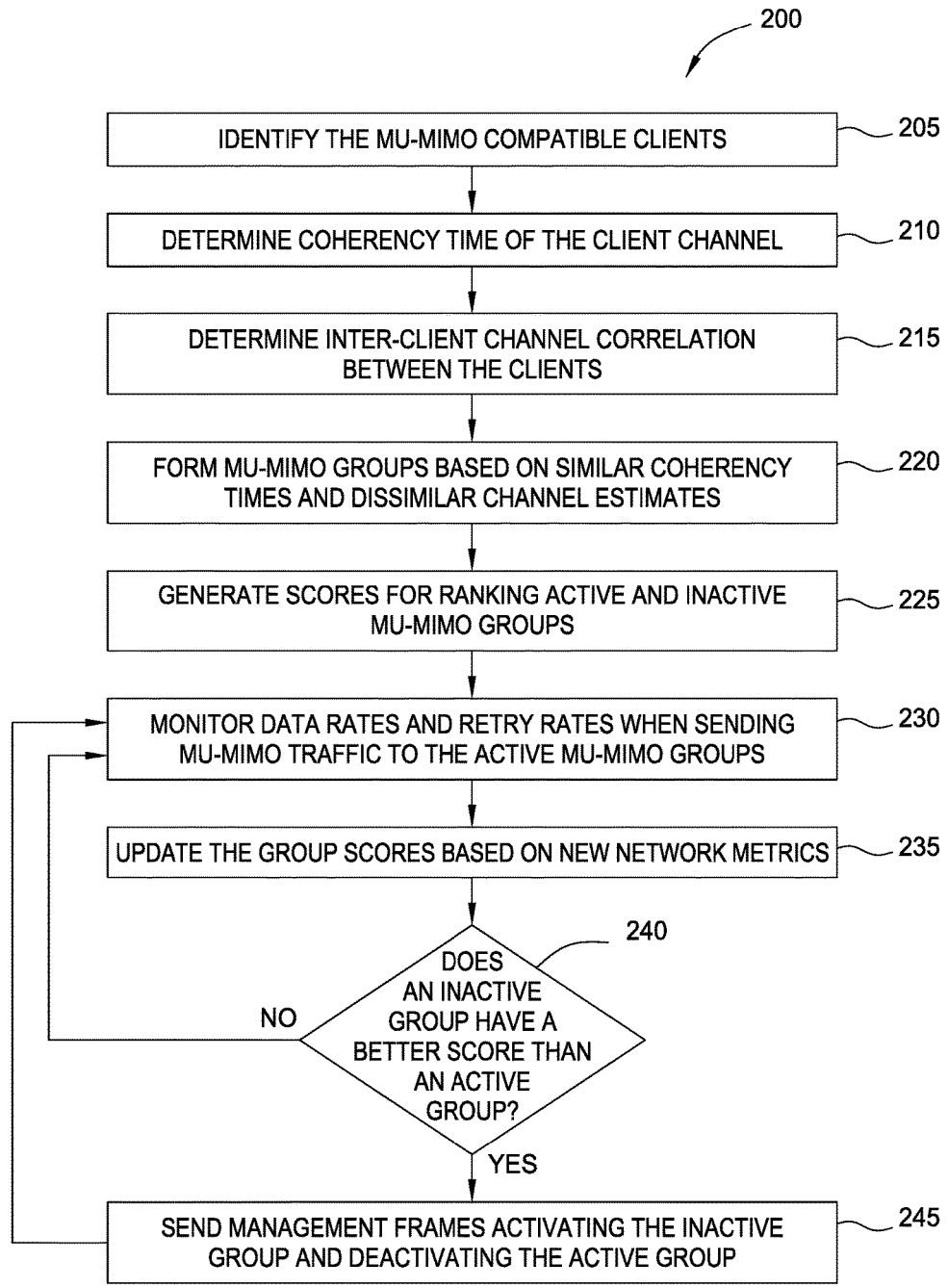
FIG. 2 is a flowchart for dynamically arranging clients in MU-MIMO groups, according to one embodiment described herein.

FIG. 2 is a flowchart of a method 200 for dynamically arranging clients in MU-MIMO groups, according to one embodiment described herein. At block 205, the MU-MIMO controller identifies the MU-MIMO compatible clients connected to the AP. Because MU-MIMO is relatively new and is not supported by every network and client device, not every device connected to the AP may be compatible. Once identified, the MU-MIMO controller may generate a list of potential client devices that can be used to form the MU-MIMO groups.

At block 210, the statistics module in the AP determines a coherency time for the channel between each of the client devices and the AP. In one embodiment, the AP uses channel sounding to generate a channel matrix which includes complex numbers representing the amplitude and phase changes resulting from transmitting wireless signals in the channel. Because of the different locations of the client devices in the physical environment surrounding the AP, each client device may have different channel characteristics, and thus, a different channel matrix. Moreover, the channel characteristics may change as the client device moves, the AP moves, or the physical environment changes. For example, if the client device is a mobile phone carried by a user, the channel between the AP and the mobile phone changes as the user moves. Even if the client device and the AP remain stationary, the channel may change if, for example, objects in the environment move such as a person moving between the AP and the client device or shutting a door in a room containing the client device. When the channel characteristics change, the effectiveness of MU-MIMO may decrease. As described above, the ability to selectively deliver data to client devices in a MU-MIMO group depends on the pseudo inverse of the channel matrix. If the channel characteristics change because of one or more of the factors mentioned above, the channel matrix may no longer accurately represent the amplitude and phase changes resulting from transmitting wireless signals in the channel. Performing MU-MIMO using an out-of-date channel matrix can result in lower data rates and increased retry rates.

The AP and client device can monitor the data rates and retry rates to identify when a channel should be resounded. By monitoring these network metrics over time, the statistics module in the AP can identify the coherency time for the client device indicating the time that can elapse before the channel between the AP and the client device is resounded to generate a new channel matrix. Assuming the AP is stationary and the physical environment does not change, client devices that are moving have shorter coherency times than stationary client devices. For example, when being moved by a user, a mobile phone may have coherency time of 20 milliseconds while the same mobile phone lying on a desk may have a coherency time of a half a second or more.

It may be advantageous to assign client devices with similar coherency times to the same MU-MIMO group. In one embodiment, the client devices in a MU-MIMO group are resounded using the shortest coherency time corresponding to the client devices in that group. For example, one client device may have a coherency time of 50 milliseconds while the other client devices in the group have coherency times greater than 200 milliseconds. Nonetheless, in this embodiment, the channels for all of the client devices in the group are resounded every 50 milliseconds. Thus, grouping client devices with different coherency times may reduce throughput since the AP spends time resounding some of the channels which may still have valid channel matrices. Put differently, the AP would perform sounding unnecessarily on client devices that still have satisfactory channel estimates, thereby wasting airtime. Thus, as described below, the MU-MIMO controller may use coherency time to assign the client devices to a MU-MIMO group.

At block 215, the statistics module determines inter-client channel correlation between the clients. In one embodiment, the statistics module correlates the values of the channel matrix for one of the client devices to the values of the channel matrices for each of the other client devices connected to the AP. For example, the statistics module may determine a correlation value by using a complex conjugate and a summation for each of the subcarriers in a frequency band. In this example, the AP may generate a channel matrix for each subcarrier in the frequency band which can be correlated to the channel matrix for each subcarrier corresponding to a different client device. The correlation values may range from 1 to 0 where 1 means the channel (which includes the subcarriers) is the same and 0 means the channels are orthogonal.

MU-MIMO may perform better when the client devices in the same group have different channels characteristics. Put differently, the MU-MIMO controller may assign client devices with low correlation values to the same group. When the client devices in the same group have channels with low correlation values, the amount of leakage caused by the MU-MIMO frame may be reduced. The statistics module can store the correlation values between the client devices in memory which can be accessed by the MU-MIMO controller. Other metrics may be measured, stored and used also.

At block 220, the MU-MIMO controller forms MU-MIMO groups based on similar coherency times and dissimilar channel estimates (e.g., low correlation values). For example, the controller may assign client devices with similar coherency times (e.g., +/−20 ms) and different channel characteristics (e.g., correlation values less than 0.2) to the same group. In this manner, the power leakage between the client devices may be mitigated when transmitting a MU-MIMO frame to the group.

In one embodiment, to group the client devices, the MU-MIMO controller selects a first client device and identifies a different client device which has the most similar coherency time and most dissimilar channel estimate using the correlation values. The controller can continue to add client devices that have coherency times and dissimilar channel estimates that are most similar to the two client devices in the group until the group reaches a predefined number of client devices. The MU-MIMO controller may change the size of the group depending on the number of client devices communicating with the AP. For example, the fewer the number of clients, the smaller the MU-MIMO groups and vice versa.

Once that group is formed, the MU-MIMO controller then selects another client device currently not assigned a group and repeats the process by evaluating the coherency time and correlation values for client devices that have not already been assigned a group. The MU-MIMO controller continues to form the groups until all the client devices are assigned into a group or until a predefined number of groups has been reached. For example, the controller may assign each client device to only one of the groups. However, the controller may have a maximum number of groups it wants to manage (which requires processing time and memory to manage). Thus, the MU-MIMO controller may cap the number of groups to 100 even if some of the client devices are not assigned to a group.

In another embodiment, the MU-MIMO controller may assign client devices to multiple groups. For example, assume that there are only 100 client devices connected to the AP and the MU-MIMO controller initially assigns a maximum of five clients in each group. As such, the MU-MIMO controller initially assigns the 100 clients to 20 MU-MIMO groups. However, the MU-MIMO controller may be configured to manage 100 MU-MIMO groups. The controller may use different criteria such as focusing only on coherency time or only inter-client channel correlation values to group the client devices to form 80 other MU-MIMO groups. In another embodiment, the controller may use the same criteria but decrease or increase the size of the groups such that the 80 new groups have a fewer or greater number of client devices than the original 20 MU-MIMO groups. In this embodiment, the client devices can be assigned to multiple MU-MIMO groups.

In one embodiment, the MU-MIMO controller merges groups if their coherency times are similar and their channel estimates are dissimilar. For example, if the average coherency time of the client devices in Group A is within 10% of the average coherency time of the clients in Group B and the client devices in the two groups have correlation values less than 0.2, the MU-MIMO controller may merge the group. Further, the MU-MIMO controller may include a merging penalty to prevent too many groups from merging. For example, as the groups shrink towards the maximum number of active group identifiers permitted (e.g., a maximum of 62 different group identifiers according to IEEE 802.11ac but multiple groups are allowed to share the same group identifies so long as any client device assigned to multiple groups that have the same group identifier has the same user position in each group), the controller may tighten the requirements for merging groups—e.g., the average coherency times have to be within 5% of each other rather than 10%.

In one embodiment, the MU-MIMO controller manages or forms more MU-MIMO groups than group identifiers defined by the wireless standard. Using IEEE 802.11ac as an example, this standard defines 62 MU-MIMO active group identifiers (which can form 62 groups assuming a group identifier is used only once). For example, the MU-MIMO controller may use method 200 to form 100 MU-MIMO groups and map several groups to the same group identifier. This is permissible as long as a client has the same user position in all groups, or is not a member of the group. As used herein, "activating" a group means the AP will use that group for MU-MIMO transmissions when suitable traffic is available, and if any client needs an update to its mapping from group identifier to user position then the AP sends a management frame to the client with the new mapping. In one embodiment, to simplify AP the implementation, the AP always sends out management frames to affected clients when the client is added to an active group or an inactive group containing the client becomes active. In another embodiment, the AP might always send out management frames to affected clients when the client is added to an active group, an inactive group containing the client becomes active, when the client is deleted from an active group, or an active group containing the client becomes inactive. Thus, while the MU-MIMO controller activates N number of active MU-MIMO groups (and has informed the client devices of those N groups), the MU-MIMO controller may assign the client devices to form M number of inactive or backup groups (where N+M is the total number of MU-MIMO groups managed by the AP). According to embodiment, the client may or may not be aware of some or all of the M inactive groups. For example, the MU-MIMO controller may make the assignments of the client devices to the inactive groups internally without informing the client devices of these assignments. As described below, the inactive groups are evaluated and monitored in case the MU-MIMO controller decides to replace one of the active MU-MIMO groups with one of the inactive MU-MIMO groups.

At block 225, the MU-MIMO controller generates scores for ranking the active and inactive (if any) groups. In one embodiment, the scores represent the similarity of the coherency time and the dissimilarity of the channel estimates for each of the groups. The scores provide a common metric for comparing the MU-MIMO groups to each other. In one embodiment, the MU-MIMO controller determines which of the MU-MIMO groups formed at block 220 are active MU-MIMO groups (i.e., available for transmitting MU-MIMO traffic) and which are inactive group (i.e., not available for MU-MIMO traffic) using the scores. For example, the controller may select the groups with the highest scores as the N number of active groups.

FIG. 3 illustrates ranking active MU-MIMO groups 300 and inactive MU-MIMO groups 350, according to one embodiment described herein. As shown, the active groups 300 include Groups A-C but could include any number of groups. Each group includes an average coherency time 305 for the client devices in the group, channel correlation values 310 representing the dissimilarities between the channels of the client devices in the group, and a score 315. The MU-MIMO controller uses the score 315 to rank the groups where, in this example, Group A has the highest score and Group C has the lowest score of the active groups 300.

In one embodiment, the score 315 is a weighted average between the average coherency time 305 and the channel correlation values 310. For example, the weights may be set to emphasize similar coherency times among the client devices in the group more than dissimilar channel estimates, or vice versa.

Each of the inactive MIMO groups 350 also includes an average coherency time 305, the channel correlations 310 values, and the scores 315. Like the active groups 300, the inactive groups 350 are ranked from highest to lowest scores 315. In this example, Group D has a score 315 that is lower than Group C but is greater than all of the other inactive groups 350. In one embodiment, the inactive groups 350 may be known only to the AP. Thus, the MU-MIMO controller may manage the inactive groups 350 without informing the client devices that they are assigned to one of the inactive groups 350.

Returning to method 200, at block 230, the MU-MIMO controller updates the group scores based on new statistical data. In one embodiment, the statistics module continues to, at intervals, generate updated coherency times and inter-client channel correlation values for the client devices. The controller can use the updated values for these network metrics to update the scores for the active and inactive MU-MIMO groups.

The client devices do not need to be in an active MU-MIMO group for the MU-MIMO controller to update the coherency time and the inter-client channel correlation values for the client device. For example, if a client device is not in an active MU-MIMO channel, the AP may still resound the channel to update the network metrics. The MU-MIMO controller can use the updated metrics to update the score for any inactive MU-MIMO groups that contains the client device.

At block 235, the statistics module monitors data rates and retry rates when sending MU-MIMO traffic to the active MU-MIMO groups. In this example, the data rates and retry rates are network metrics derived from historical data that can be used to rank MU-MIMO groups. In one embodiment, the AP transmits management frames which activate the MU-MIMO groups with the highest scores while the MU-MIMO groups with the lowest scores are designated as the inactive MU-MIMO groups. When activated, the active MU-MIMO groups are available for MU-MIMO traffic. When an active MU-MIMO group is selected, the statistics module records the data rate to the client devices in the group and the number of times a frame needs to be resent (e.g., a retry rate or an error rate). In one embodiment, the statistics module identifies an average data rate and/or retry rate for the client devices using the MU-MIMO traffic. The MU-MIMO controller uses the data rate and retry rate to update the score of the MU-MIMO group or groups containing the client device. For example, a low data rate or a high retry rate may indicate that the group is a poor choice for the client device. For instance, there may be interference at the client device caused by power leakage from MU-MIMO traffic intended to other client devices in the group. Thus, a low data rate or high retry rate may cause the MU-MIMO controller to reduce the score of the active MU-MIMO group containing that client device.

In one embodiment, the statistics module generates data rates and retry rates when transmitting data to the client devices using other means besides MU-MIMO, such as single user transmission. For example, a first client device may receive data at a rate of 20 Mb/sec while a second client device receives data at a rate of 500 Mb/sec using single user transmission because the first client device is farther from the AP than the second client device. Given this disparity in data rates, the MU-MIMO controller may reduce the score of any active or inactive MU-MIMO groups that contain both the first and second client devices. Conversely, the MU-MIMO controller may increase the score for an active or inactive MU-MIMO group where the client devices in that group receive data at similar data rates regardless whether the data is sent using MU-MIMO or single user transmission.

FIG. 4 illustrates adjusting the ranking of the active and inactive MU-MIMO groups in FIG. 3, according to one embodiment described herein. In contrast to FIG. 3, in FIG. 4 the active MU-MIMO groups 400 and inactive MU-MIMO groups 450 also store the data rate 405 which may include data rates corresponding to the client devices in the group. The data rate 405 may be measured when transmitting MU-MIMO traffic to the client devices or when transmitting single-user traffic to these devices.

When an AP first starts up (or when a client device first joins the AP), the statistics module may not have enough information to establish a data rate for the client devices (as shown in FIG. 3). However, after the MU-MIMO groups are formed and traffic is transmitted to the client devices, the statistics module can determine the data rate 405 which affects the score 315. For example, a disparity between data rates of the client devices or a low average data rate 405 may reduce the score 315. In contrast, a high average data rate or similar data rates between the client devices may increase the score 315.

In FIG. 4, the data rate 405 affects the score 315 which changes the ranking of the groups relative to FIG. 3. Specifically, Group B now has a higher score 315 than Group A in the active MU-MIMO groups 400 while Group E has a higher score 315 than Group D in the inactive MU-MIMO groups 450. These changes in rankings may be due to the data rate 405 as well as updated values for the coherency time 305 or the channel correlation values 310.

Returning to method 200, at block 240, the MU-MIMO controller determines if an inactive group has a better score than an active group. Stated differently, the controller conducts a performance evaluation using the network metrics and score to determine whether an inactive group may provide better a better substitute than an active group. At intervals, the MU-MIMO controller may evaluate the updated network metrics gathered by the statistics module and update the scores of the active and inactive MU-MIMO groups.

Using FIG. 4 as an example, updated network metric values may result in Group E (an inactive MU-MIMO group) having a higher score than Group C (an active MU-MIMO group). In response, at block 245, the MU-MIMO controller sends management frames activating the inactive group (e.g., Group E) and deactivating the active group (e.g., Group C). The management frames may indicate to the client devices in the newly activated group (e.g., a substitute group) that they are part of the group. On the other hand, the management frames indicate to the client device in the deactivated group that this group has been eliminated. However, although the deactivated group is no longer used to transmit MU-MIMO traffic, the controller may continue to manage the deactivated group and update its score—e.g., Group C is moved in the inactive MU-MIMO groups 450 shown in FIG. 4. As the network metrics change, the deactivated group may again have a score that is greater than an active group and be reactivated.

In one embodiment, the controller may switch out a subset of the active groups with the lowest scores with a subset of the inactive groups with the highest scores even though the inactive groups have scores that are lower than the active groups. One reason for doing so is that activating the inactive groups may enable the statistics module to generate better network metrics for the inactive groups such as data and retry rates for those groups when transmitting MU-MIMO traffic. Thus, after activating the inactive groups and sending MU-MIMO traffic to these groups, the controller can then compare the updated scores with the scores of the active groups that were deactivated which may result in a more equal comparison.

In this manner, the method 200 provides examples of using network metrics to form MU-MIMO groups and an overall score for the groups. By managing both active and inactive groups, the AP can identify the groups with the best scores while maintaining inactive groups that can be substituted in for low performing active groups.

Moreover, the method 200 can be used when a new client device connects to the AP even after the active and inactive MU-MIMO groups have been formed. Using network metrics, the MU-MIMO controller may identify the current MI-MIMO group that best matches the new client device and assign the client device to that group. For example, the controller may identify the MU-MIMO group that has the most similar coherency time, most dissimilar channel estimates, and most similar data rate (assuming all these network metrics are known) for the client device.

In one embodiment, the MU-MIMO controller may, at intervals, eliminate one or more of the inactive groups that have the lowest scores. Doing so enables the MU-MIMO controller to form new groups by, for example, combining current groups or eliminating one or more client devices from an inactive group with a low score to determine if the new group has a better score. In this manner, the controller can use the network metrics and techniques discussed above to form new groups to replace the lowest ranked inactive groups.

Figure 5:
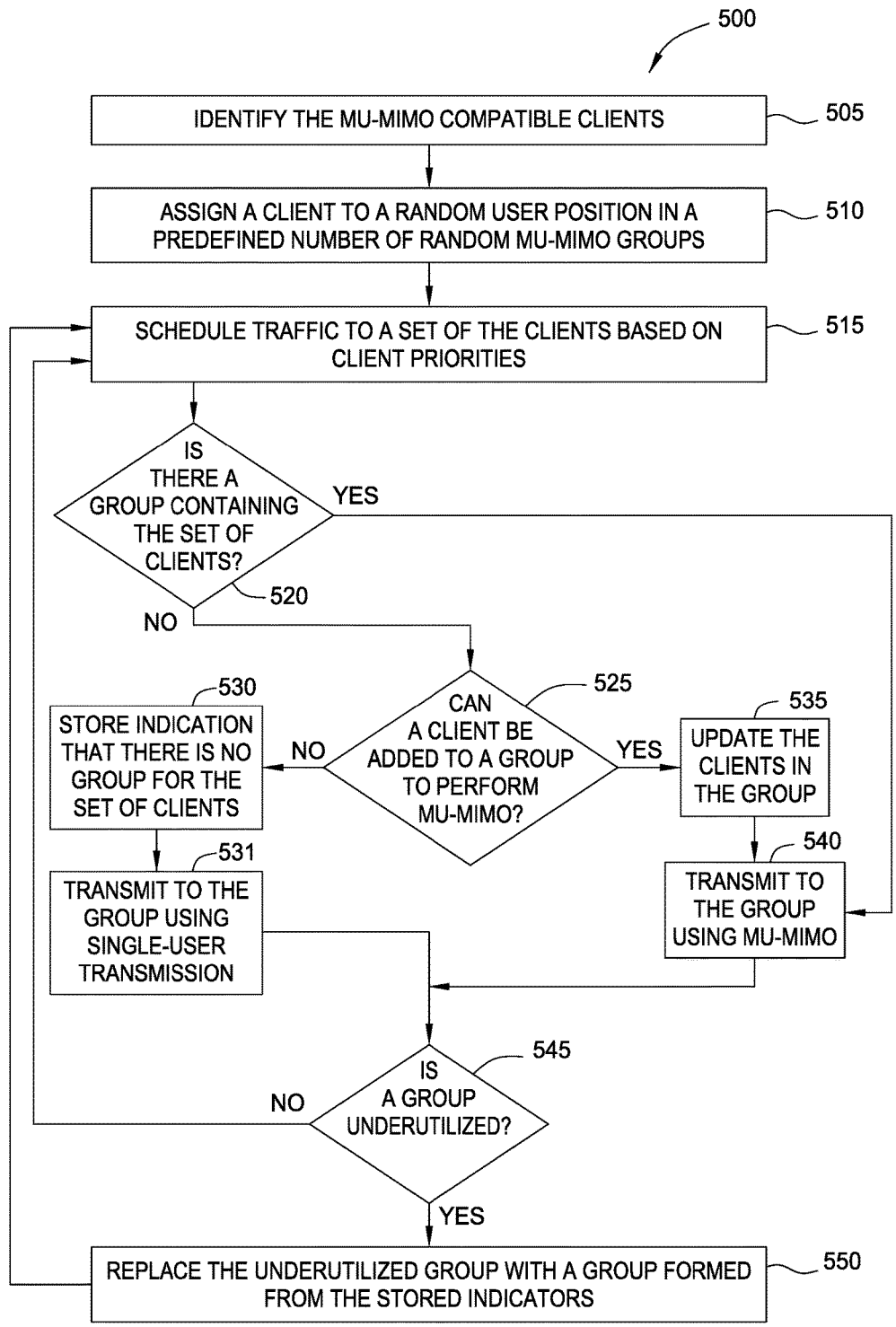
FIG. 5 is a flowchart for dynamically arranging clients in MU-MIMO groups, according to one embodiment described herein.

FIG. 5 is a flowchart of a method 500 for dynamically arranging clients in MU-MIMO groups, according to one embodiment described herein. At block 505, the MU-MIMO controller identifies the MU-MIMO compatible clients connected to the AP. Because MU-MIMO is relatively new and is not supported by every network and client device, not every device connected to the AP may be compatible. Once identified, the MU-MIMO controller may generate a list of potential client devices that can be used to form multiple MU-MIMO groups.

At block 510, the MI-MIMO controller assigns a client to a random user position in a predefined number of random MU-MIMO groups. For example, when an AP first powers on or when a new client device connects to the AP, the controller may assign the client device or devices to ten different MU-MIMO groups. In one embodiment, the controller may have formed the maximum number of MU-MIMO groups permitted by the wireless standard. As a result of performing block 510, each of the groups may have different numbers of client devices assigned to the groups.

Figure 6:
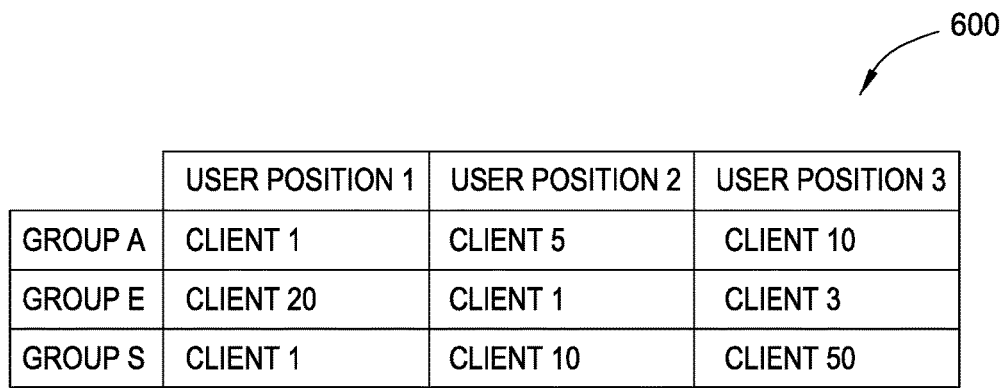
FIG. 6 illustrates randomly assigning a client device to multiple MU-MIMO groups, according to one embodiment described herein.

FIG. 6 illustrates randomly assigning a client device to multiple MU-MIMO groups, according to one embodiment described herein. Specifically, FIG. 6 illustrates a chart 600 where Client 1 is randomly assigned to three different MU-MIMO groups as well as being randomly assigned a user position in those groups. In this case, Client 1 is assigned to User Position 1 of Group A, User Position 2 of Group E, and User Position 1 of Group S. Although the Groups A, E, and S contain the same number of client devices, in other embodiments, the groups may contain a different number of devices. In one embodiment, the MU-MIMO controller may assign the client devices to only active groups—i.e., the controller does not manage inactive groups like in method 200.

Returning to method 500, at block 515, the scheduler in the AP schedules traffic to a set of the clients based on client priorities. For example, the AP may store data to be transmitted to the client devices in a queue. Different client devices may have higher priority values than other client devices. The scheduler can use the priority values to select which of the client devices should receive their queued data first. In one embodiment, the scheduler may use a predefined value to determine the number of clients in the set—e.g., the scheduler selects the five highest priority client devices that have data in the queue as the set of client devices.

At block 520, the scheduler determines if there is a MU-MIMO group containing the set of clients. That is, the schedule determines if the MU-MIMO controller has formed a group that contains the set of clients that is currently scheduled to receive data from the AP. Using FIG. 6 as an example, if the scheduler has selected Clients 1, 5, and 10 (or some sub-set thereof), then the AP can transmit a MU-MIMO frame to Group A.

If there is a match, the method 500 proceeds to block 540 where the AP transmits an MU-MIMO frame or frames to the selected client devices in the group. That is, instead of sending the data using single-user transmission, the AP can send the data in parallel to the clients in the group using MU-M IMO traffic.

However, if there is not a match, the method 500 proceeds to block 525 where the MU-MIMO controller determines if a client can be added to a group to perform MU-MIMO. For example, the set of client devices selected by the scheduler may include Clients 1, 5, 10, and 15. Since Group A in FIG. 6 includes three of those four clients, the controller determines whether Client 15 can be added to Group A. For example, the MI-MIMO controller may add a client to a MU-MIMO group only if the group already has at least 80% of the clients in the set or if only two or fewer client devices need to be added to the group so that the membership of the group includes all of the client devices in the set. Limiting additions to the group may be advantageous to prevent groups from growing too large (which may increase power leakage). Moreover, adding clients requires sending out another management frame to change the group membership which takes time that could otherwise be used to transmit user data to the client devices.

If the MU-MIMO controller determines to add client devices to the group, the method 500 proceeds to block 535 where the AP sends a management frame to add the client device (or devices) to the group such that the group includes the set of client devices selected at block 515. Of course, the group may include more than the set of client devices in which case, not all of the client devices in the group receive data from the AP. At block 540, the AP transmits the MU-MIMO traffic to the group.

However, if the controller decides not to add the client devices to the group, the method 500 proceeds from block 525 to block 530 where the controller stores an indication that there is no MU-MIMO group that includes all of the client devices selected by the scheduler. That is, the controller keeps tracks of the sets of client devices that were scheduled for possible MU-MIMO transmission but where there was no compatible MU-MIMO group for those sets. Moreover, the controller may count the number of times a particular set of client devices was scheduled for MU-MIMO transmission but had to be transmitted using a different technique—e.g., transmitting the data to the group using single-user transmission at block 531.

Figure 7:
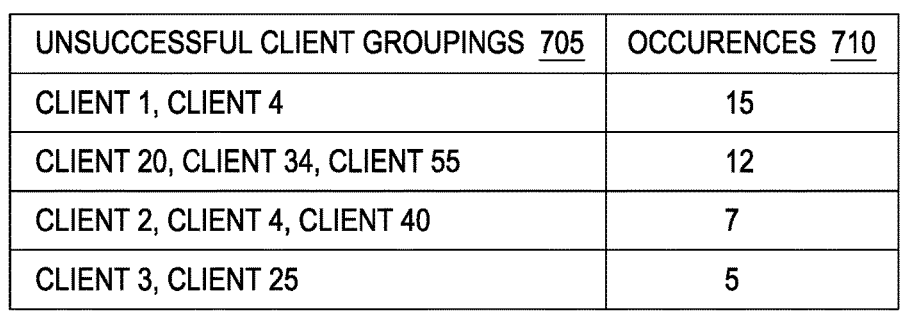
FIG. 7 illustrates tracking sets of clients that do not have an associated MU-MIMO group, according to one embodiment described herein.

FIG. 7 illustrates tracking sets of clients that do not have an associated MU-MIMO group, according to one embodiment described herein. Chart 700 has a first column identifying unsuccessful client groupings 705 which includes sets of client devices that where selected by the scheduler at block 515 of method 500 but do not have an associated MU-MIMO group. The chart 700 also includes a second column that identifies the number of times or occurrences 710 where the set of client devices were selected by the scheduler but could not be transmitted using MU-MIMO because the set of client devices are not in a MU-MIMO group. In one embodiment, the AP transmits the data to each of the client devices in the grouping 705 individually using single-user transmission rather than using MU-MIMO.

Tracking the history of the unsuccessful client groupings 705 using the occurrences 710 is advantageous since this indicates to the controller how often the set of client devices was scheduled for data transmission. For example, the client devices may be related such that the AP frequently has data in its transmission queue for all of the clients in the set. Thus, the number of occurrences 710 may indicate to the controller the likelihood that the same set of client devices will be selected by the scheduler in the future. In this embodiment, the chart 700 ranks the groupings 705 according to the number of occurrences 710 the client devices were selected.

Returning to method 500, at block 545, the MU-MIMO controller determines if an active MU-MIMO group is underutilized. Put differently, the controller performs a performance evaluation to determine how often the MU-MIMO group is used for transmitting MU-MIMO traffic. For example, the controller may track how many times in a fixed time period the MU-MIMO groups are sent MU-MIMO traffic. In another embodiment, the controller determines the data rate of the MU-MIMO traffic to the client devices in the group which may indicate the utilization of the group. In one embodiment, the controller ranks the MU-MIMO groups according to a utilization parameter and, at intervals, identifies any underutilized groups. For example, an underutilized group may be a group with a utilization score less than a threshold. In another embodiment, rather than using a fixed threshold, the controller may flag the MU-MIMO group or groups with the lowest utilization score or score. For example, every second, the controller may identify the five lowest utilized MU-MIMO groups of the N number of active groups.

If there is an underutilized group, the method 500 proceeds to block 550, but if not, the method 500 returns to block 515. At block 550, the MU-MIMO controller replaces the underutilized group with a substitute MU-MIMO group formed from the indications stored at block 530. Using FIG. 7 as an example, the controller may replace the underutilized group with a group containing Client 1 and Client 4 since this grouping 705 occurred most frequently. If there are multiple underutilized groups, the controller may continue down the ranking in the chart 700 to form new groups. In this manner, the controller can dynamically adjust the groups either by adding new client devices as shown in blocks 525 and 535 or by replacing underutilized groups with new groups formed from the historical data stored at block 530.

In one embodiment, the controller may randomize some of the groups added at block 550 since past performance may not always indicate future performance. Put differently, just because a set of clients were selected together in the past by the scheduler, that relationship between the clients may have been temporary or ceased. Thus, randomly selecting some groups may provide an alternative to using the ranking in chart 700 which may be based on potentially stale or out-of-date data.

In one embodiment, the techniques taught in method 200 are used in method 500 and the techniques in method 500 are used in method 200. For example, in addition to using the network metrics to form groups in method 200, the controller may also form groups by randomly selecting client devices as described in method 500 or by randomly assigning additional client devices to the groups formed using the network metrics. Furthermore, the method 200 may use the historical data generated in method 500 to score the active MU-MIMO groups. That is, when performing method 200, the controller may track scheduled sets of client devices that are not associated with a current MU-MIMO group and use this information to generate new groups for replacing low performing inactive MU-MIMO groups.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A network device, comprising:
   at least one radio;
   an antenna coupled to the at least one radio; and
   control logic configured to:
   form a plurality of multi user multiple input multiple output (MU-MIMO) groups, each of the plurality of MU-MIMO groups comprising a first plurality of client devices;
   transmit MU-MIMO data to the client devices using the plurality of MU-MIMO groups and the radio;
   schedule a plurality of different sets of client devices for data transmission;
   upon determining none of the plurality of MU-MIMO groups contains the sets of client devices, transmit data to the sets of client devices using single-user transmission;
   track the number of times data is scheduled for transmission to the sets of client devices using single-user transmission;
   identify one of the plurality of MU-MIMO groups based on a performance evaluation; and
   replace the identified MU-MIMO group with a substitute MU-MIMO group selected from one of the sets of client devices which was scheduled most often for data transmission.

2. The network device of claim 1, wherein the performance evaluation comprises evaluating at least one of coherency times and inter-client channel correlation values associated with the identified MU-MIMO group.

3. The network device of claim 2, wherein the control logic is configured to, before replacing the identified MU-MIMO group with the substitute MU-MIMO group:
   assign respective scores to the plurality of MU-MIMO groups and the substitute MU-MIMO group based on the coherency times and inter-client channel correlation values.

4. The network device of claim 2, wherein the control logic is configured to, before replacing the identified MU-MIMO group with the substitute MU-MIMO group:
   rank a plurality of inactive MU-MIMO groups using respective scores based on the coherency times and inter-client channel correlation values, wherein the plurality of inactive MU-MIMO groups are not available for MU-MIMO, wherein the plurality of inactive MU-MIMO groups comprises the substitute MU-MIMO group; and
   select the substitute MU-MIMO group to replace the identified MU-MIMO group in response to the substitute MU-MIMO group having a higher score than the identified MU-MIMO group.

5. The network device of claim 1, wherein the control logic is configured to:
   monitor data rates corresponding to the first plurality of client devices assigned to the plurality of MU-MIMO groups;
   update respective scores corresponding to the plurality of MU-MIMO groups based on the data rates; and
   select the identified MU-MIMO group from among the plurality of MU-MIMO groups using the respective scores.

6. The network device of claim 1, wherein forming the plurality of MU-MIMO groups comprises:
   randomly assigning each of the first plurality of client devices into a predefined number of the plurality of MU-MIMO groups, wherein the predefined number is greater than one.

7. The network device of claim 1, wherein the control logic is configured to:

transmit a MU-MIMO management frame to a client device only when the control logic changes a mapping from group identifier to user position for the client device.

8. The network device of claim 1, wherein the control logic is configured to:
transmit at least one MU-MIMO management frame when the control logic at least one of changes a number of the first plurality of client devices in one of the plurality of MU-MIMO groups and changes one of the plurality of MU-MIMO groups between inactive and active states.

9. The network device of claim 1, wherein replacing the identified MU-MIMO group with the substitute MU-MIMO group comprises:
deactivating the identified MU-MIMO group such the identified MU-MIMO group is not available for transmitting MU-MIMO traffic.

10. A non-transitory computer-readable storage medium for operating a network device, the computer-readable storage medium comprising:
computer-readable program code configured to perform an operation when executed on a computing processor, the operation comprising:
forming a plurality of MU-MIMO groups, each of the plurality of MU-MIMO groups comprising a first plurality of client devices;
transmitting MU-MIMO data to the client devices using the plurality of MU-MIMO groups;
scheduling a plurality of different sets of client devices for data transmission;
upon determining none of the plurality of MU-MIMO groups contains the sets of client devices, transmitting data to the sets of client devices using single-user transmission;
tracking the number of times data is scheduled for transmission to the sets of client devices using single-user transmission;
identifying one of the plurality of MU-MIMO groups based on a performance evaluation; and
replacing the identified MU-MIMO group with a substitute MU-MIMO group selected from one of the sets of client devices which was scheduled most often for data transmission.

11. The computer-readable storage medium of claim 10, wherein the performance evaluation comprises evaluating at least one of coherency times of channels and inter-client channel correlation values associated with the identified MU-MIMO group.

12. The computer-readable storage medium of claim 11, wherein the operation comprises, before replacing the identified MU-MIMO group with the substitute MU-MIMO group:
assigning respective scores to the plurality of MU-MIMO groups and the substitute MU-MIMO group based on the coherency times and inter-client channel correlation values.

13. The computer-readable storage medium of claim 11, wherein the operation comprises, before replacing the identified MU-MIMO group with the substitute MU-MIMO group:
ranking a plurality of inactive MU-MIMO groups using respective scores based on the coherency times and inter-client channel correlation values, wherein the plurality of inactive MU-MIMO groups are not available for MU-MIMO, wherein the plurality of inactive MU-MIMO groups comprises the substitute MU-MIMO group; and
selecting the substitute MU-MIMO group to replace the identified MU-MIMO group in response to the substitute MU-MIMO group having a higher score than the identified MU-MIMO group.

14. The computer-readable storage medium of claim 10, wherein the operation comprises:
monitoring data rates corresponding to the first plurality of client devices assigned to the plurality of MU-MIMO groups;
updating respective scores corresponding to the plurality of MU-MIMO groups based on the data rates; and
selecting the identified MU-MIMO group from among the plurality of MU-MIMO groups using the respective scores.

15. The computer-readable storage medium of claim 10, wherein forming the plurality of MU-MIMO groups comprises:
randomly assigning each of the first plurality of client devices into a predefined number of the plurality of MU-MIMO groups, wherein the predefined number is greater than one.

16. A method of operating a network device, comprising:
forming a plurality of MU-MIMO groups, each of the plurality of MU-MIMO groups comprising a first plurality of client devices;
transmitting MU-MIMO data to the client devices using the plurality of MU-MIMO groups;
scheduling a plurality of different sets of client devices for data transmission;
upon determining none of the plurality of MU-MIMO groups contains the sets of client devices, transmitting data to the sets of client devices using single-user transmission;
tracking the number of times data is scheduled for transmission to the sets of client devices using single-user transmission;
identifying one of the plurality of MU-MIMO groups based on a performance evaluation; and
replacing the identified MU-MIMO group with a substitute MU-MIMO group selected from one of the sets of client devices which was scheduled most often for data transmission.

* * * * *